(12) United States Patent
Eleazer et al.

(10) Patent No.: US 7,892,379 B2
(45) Date of Patent: Feb. 22, 2011

(54) MOLDABLE FABRIC WITH UNIDIRECTIONAL TAPE YARNS

(75) Inventors: Howell B. Eleazer, Moore, SC (US); Heather J. Hayes, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 134 days.

(21) Appl. No.: 12/286,250

(22) Filed: Sep. 29, 2008

(65) Prior Publication Data

US 2009/0025861 A1    Jan. 29, 2009

Related U.S. Application Data

(62) Division of application No. 11/519,134, filed on Sep. 11, 2006, now abandoned.

(51) Int. Cl.
*B32B 37/02* (2006.01)
*B32B 37/12* (2006.01)

(52) U.S. Cl. ..................... 156/182
(58) Field of Classification Search ............. 156/182; 428/105
See application file for complete search history.

(56) References Cited

U.S. PATENT DOCUMENTS

| 4,079,161 A | 3/1978 | Kile ................... 428/220 |
| 4,213,812 A | 7/1980 | Boultinghouse ........... 156/226 |
| 4,309,487 A | 1/1982 | Holmes ................. 428/516 |
| 4,316,933 A | 2/1982 | Fraser ................. 428/294 |
| 4,403,012 A | 9/1983 | Harpell et al. .......... 428/290 |
| 4,426,415 A | 1/1984 | Avery ................... 428/17 |
| 4,457,985 A * | 7/1984 | Harpell et al. ............ 442/301 |
| 4,622,254 A | 11/1986 | Nishimura et al. .......... 428/102 |
| 4,705,706 A | 11/1987 | Avery .................... 428/17 |
| 4,820,568 A | 4/1989 | Harpell et al. ............ 428/113 |
| 4,916,000 A | 4/1990 | Li et al. ................. 428/105 |
| 4,953,234 A | 9/1990 | Li et al. .................. 2/412 |

(Continued)

FOREIGN PATENT DOCUMENTS

EP    0 733 460    9/1996

(Continued)

OTHER PUBLICATIONS

Alcock et al: "The Mechanical Properties of Unidirectional All-polypropylene Composites" Composites Part A: Applied Science and Manufacturing, Elsevier Science Publishers B.V., Amsterdam, NL, vol. 37, No. 5, May 2006, pp. 716-726, XP005330968 ISSN: 1359-835X the whole document.

*Primary Examiner*—Kat Wyrozebski
*Assistant Examiner*—Daniel Lee
(74) *Attorney, Agent, or Firm*—Cheryl J. Brickey (57) ABSTRACT

The invention relates to an impact resistant component comprising at least two composite sheets fused together, each composite sheet comprising an adhesive layer fused between two unidirectional sheets, wherein each unidirectional sheet comprises a plurality of monoaxially drawn fibers arranged substantially parallel to one another along a common fiber direction, the fibers comprising a base layer of a strain oriented polymer disposed between surface layer(s) of a heat fusible polymer, wherein the surface layer(s) are characterized by a melting temperature below that of the base layer to permit fusion bonding upon application of heat, and wherein the adhesive layer has a melting temperature below that of the base layer of the unidirectional sheet.

14 Claims, 8 Drawing Sheets

U.S. PATENT DOCUMENTS

| | | | |
|---|---|---|---|
| 4,980,227 A | 12/1990 | Sekiguchi et al. | 442/3 |
| 5,112,667 A | 5/1992 | Li et al. | 428/113 |
| 5,124,195 A | 6/1992 | Harpell et al. | 428/152 |
| 5,354,605 A * | 10/1994 | Lin et al. | 428/105 |
| 5,437,905 A | 8/1995 | Park | 428/105 |
| 5,443,882 A | 8/1995 | Park | 428/103 |
| 5,443,883 A | 8/1995 | Park | 428/103 |
| 5,529,826 A | 6/1996 | Tailor et al. | 428/110 |
| 5,547,536 A | 8/1996 | Park | 156/292 |
| 5,578,357 A | 11/1996 | Fink | 428/95 |
| 5,578,370 A | 11/1996 | Ferrar et al. | 428/288 |
| 5,589,115 A | 12/1996 | Sherwood | 156/89.26 |
| 5,635,288 A | 6/1997 | Park | 428/105 |
| 5,643,390 A | 7/1997 | Don et al. | 156/307.1 |
| 5,861,202 A | 1/1999 | Kimura et al. | 428/105 |
| 5,879,492 A | 3/1999 | Reis et al. | 156/72 |
| 5,925,434 A | 7/1999 | Phillips et al. | 428/95 |
| 5,935,651 A | 8/1999 | Klocek et al. | 427/256 |
| 5,935,678 A * | 8/1999 | Park | 428/105 |
| 5,962,101 A | 10/1999 | Irwin, Sr. et al. | 428/92 |
| 6,054,086 A | 4/2000 | Kurihara et al. | 264/147 |
| 6,083,583 A | 7/2000 | Klocek et al. | 428/182 |
| 6,127,293 A | 10/2000 | Kimura et al. | 442/199 |
| 6,156,679 A | 12/2000 | Takaoka et al. | 442/327 |
| 6,312,638 B1 | 11/2001 | Ward et al. | 264/322 |
| 6,328,923 B1 | 12/2001 | Jones et al. | 264/494 |
| 6,458,727 B1 | 10/2002 | Jones et al. | 442/409 |
| 6,475,592 B1 | 11/2002 | Irwin | 428/95 |
| 6,479,125 B1 | 11/2002 | Irwin, Sr. | 428/95 |
| 6,509,105 B2 | 1/2003 | Olvey | 428/481 |
| 6,562,435 B1 | 5/2003 | Brillhart, III et al. | 428/105 |
| 6,641,893 B1 | 11/2003 | Suresh et al. | 428/105 |
| 6,645,610 B1 | 11/2003 | Reis et al. | 428/297.4 |
| 6,740,386 B2 | 5/2004 | Hutchinson | 428/88 |
| 6,824,863 B1 | 11/2004 | Kitayama et al. | 428/299.7 |
| 6,866,912 B2 | 3/2005 | Higgins et al. | 428/95 |
| 6,897,170 B2 | 5/2005 | Barkis et al. | 442/195 |
| 6,949,280 B2 * | 9/2005 | Brillhart et al. | 428/105 |
| 7,160,599 B2 | 1/2007 | Hartman | 428/95 |
| 2003/0175474 A1 | 9/2003 | Higgins et al. | 428/95 |
| 2003/0175475 A1 | 9/2003 | Higgins et al. | 428/95 |
| 2003/0224143 A1 | 12/2003 | Ianniello et al. | 428/137 |
| 2004/0242103 A1 | 12/2004 | Loos et al. | 442/185 |
| 2005/0003727 A1 | 1/2005 | Chiou | 442/239 |
| 2005/0233107 A1 | 10/2005 | Hartman | 428/95 |
| 2005/0263234 A1 | 12/2005 | Shih | 156/60 |
| 2006/0151104 A1 | 7/2006 | Jacobs et al. | 156/308.2 |
| 2006/0222837 A1 | 10/2006 | Kismarton | 428/297.4 |
| 2007/0071940 A1 | 3/2007 | Callaway et al. | 428/92 |
| 2007/0071941 A1 | 3/2007 | Eleazer et al. | 428/92 |
| 2007/0071942 A1 | 3/2007 | Callaway et al. | 428/95 |
| 2007/0122586 A1 | 5/2007 | Hartman | 420/95 |

FOREIGN PATENT DOCUMENTS

| | | |
|---|---|---|
| EP | 0 733 476 | 9/1996 |
| EP | 0 872 586 | 10/1998 |
| EP | 1 21 338 | 6/2002 |
| EP | 1 650 021 | 4/2006 |
| GB | 1 387 701 | 3/1975 |
| JP | 62 90317 | 4/1987 |
| JP | 07300763 | 11/1995 |
| JP | 10 251956 | 9/1998 |
| JP | 2000008244 | 1/2000 |
| WO | WO 89/05367 | 6/1989 |
| WO | WO 98/12370 | 3/1998 |
| WO | WO 98/12371 | 3/1998 |
| WO | WO 0053408 | 9/2000 |
| WO | WO 02090082 | 11/2002 |
| WO | WO 02/101319 | 12/2002 |
| WO | WO 03008190 | 1/2003 |
| WO | WO 03045659 | 6/2003 |
| WO | WO 2004028803 | 4/2004 |
| WO | WO 2006046862 | 5/2006 |

* cited by examiner

MOLDABLE FABRIC WITH UNIDIRECTIONAL TAPE YARNS

CROSS-REFERENCE TO RELATED APPLICATIONS

This application is a Divisional of U.S. Ser. No. 11/519,134 filed on Sep. 11, 2006 now abandoned, which is herein incorporated by reference.

TECHNICAL FIELD

The present invention generally relates to impact resistant components, anti-ballistics panels and methods for making the components and panels. In particular, the invention relates to impact resistant components incorporating at least two composite sheets fused together, each composite sheet comprising an adhesive layer between two unidirectional sheets of aligned fiber elements or tape elements.

BACKGROUND

It has been proposed to form tape structures from polypropylene film that is coated with a layer of propylene copolymer including ethylene units such that the coating has a lower softening point than the core. Such tape structures are disclosed, for example, in U.S. Pat. No. 5,578,370 the teachings of which are hereby incorporated by reference in their entirety. U.S. Patent Application 2004/0242103A1 (incorporated by reference) has also proposed to form monoaxially drawn tape structures characterized by substantial draw ratios and incorporating a central layer of a polyolefin with one or two surface layers of a polyolefin from the same class as the central layer. The DSC melting point of the outer layers is lower than that of the central layer to facilitate heat bonding. Such drawn tape elements may be interwoven so as to form a mat structure which is then subjected to heat thereby fusing the tape elements in place. Multiple layers of such interwoven mat structures may be combined to form moldable structures of substantial thickness that may be shaped to three-dimensional configurations.

In addition to tape elements, there commonly exists fiber elements that are also characterized by having a lower melting surface than the main fiber component. A core/shell fiber generally consists of a core of one type of polymer, with a surface layer (also called a shell or cladding) of a different polymer. The fiber's mechanical properties are mainly a result of the core material, whereas the surface layer determines the external properties (e.g., adhesion, friction, softness). One advantage of a core/shell fiber is the ability to achieve a combination of such properties that would be impossible in a simple, homogeneous fiber. One type of core/shell fiber has a polyester core and a polyolefin shell (e.g., polypropylene). A typical application for this fiber is in nonwoven fabrics where the lower melting point of the polypropylene surface layer allows these strong polyester core fibers to be bonded together without losing their strength.

Anti-ballistics fibers and yarns tend to be expensive, leading to expensive anti-ballistics panels and impact resistant components made from the anti-ballistics yarns. The anti-ballistics panels made from unidirectional Kevlar and aramid fibers are typically embedded in a matrix. There is a need to produce a unidirectional anti-ballistics component or panel of fiber or tape elements using a lower amount of matrix material.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein.

DETAILED DESCRIPTION

Embodiments of the present invention will now be described by reference to the accompanying drawings, in which, to the extent possible, like reference numerals are used to designate like components in the various views.

Figure 1:
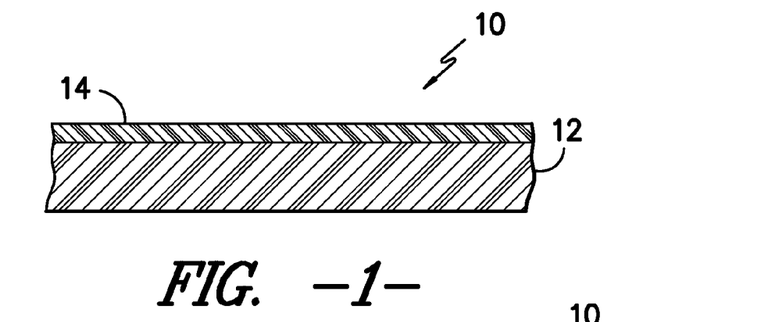
FIG. 1 illustrates schematically a cross-section of one embodiment of the monoaxially drawn tape element.
Figure 2:
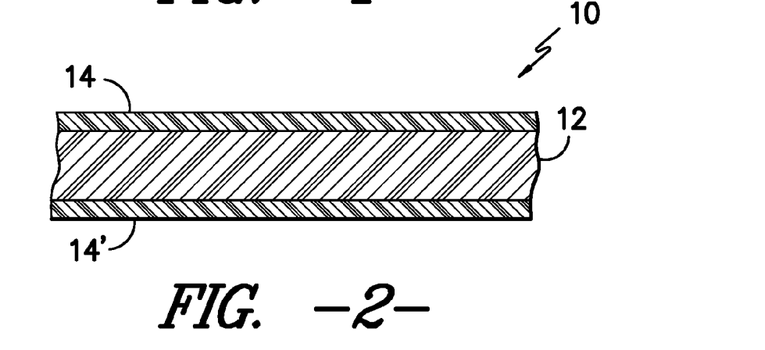
FIG. 2 illustrates schematically a cross-section of one embodiment of the monoaxially drawn tape element.

Referring to FIG. 1, there is shown one embodiment of a fiber element having a core of a strain oriented polymer and at least one surface layer of a heat fusible polymer covering at least a portion of the core, wherein the at least one surface layer is characterized by a softening temperature below that of the core to permit fusion bonding upon application of heat. Preferably, the core and/or the surface layer are an olefin polymer. In one embodiment, the fiber element is a monoaxially drawn tape element 10 made up of a surface layer 14 disposed on a core 12. The core is a tape shaped core layer having an upper and lower surface and the surface layer 14 covers one side (upper or lower surface) of the core layer 12. The tape element 10 may be formed by any conventional means of extruding multilayer polymeric films and then slitting the films into tape elements 10. Referring to FIG. 2, there is shown another embodiment of the tape elements 10 made up of a core layer 12 disposed between two surface layers 14 and 14' (the surface layers being disposed on the upper and lower surface of the core layer 12).

By way of example, and not limitation, the film may be formed by blown film or cast film extrusion. The film is then cut into a multiplicity of longitudinal strips of a desired width by slitting the film in a direction transverse to the layered orientation of core layer 12 and surface layer 14 to form tape elements 10 with cross-sections as shown in FIG. 1. The tape elements 10 are then drawn in order to increase the orientation of the core layer 10 so as to provide increased strength and stiffness of the material. In another embodiment, the surface layer(s) may be added after the drawing step. After the drawing process is complete, the resulting tape elements are in the range of about 1.0 to about 5 millimeters wide. In one embodiment, the tape elements 10 have a width to thickness ratio of between about 10 and 1000. In another embodiment, the tape elements have a modulus of between 5 and 200.

Figure 3A:
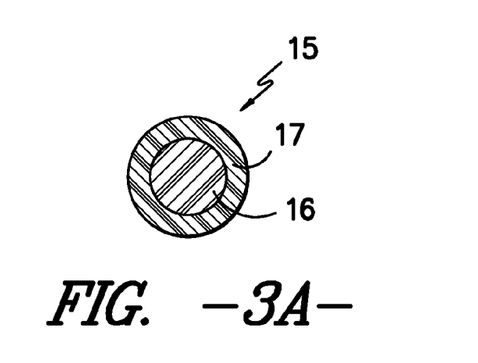
FIGS. 3A-C illustrate schematically cross-sections of embodiments of core/shell fibers elements.
Figure 3B:
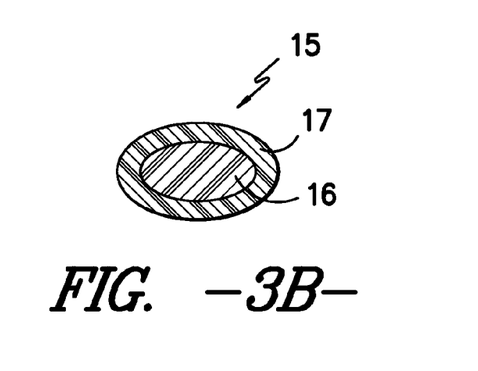
Figure 3C:
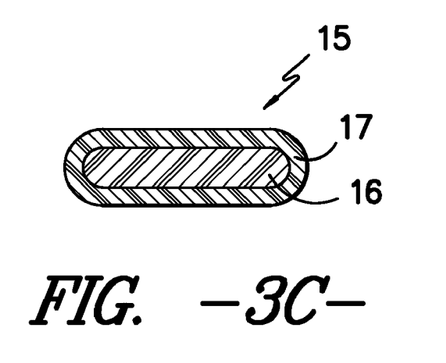

Referring to Figures now to 3A-C, there is shown some embodiments of a fiber element being a core/shell type fiber element 15 made up of a surface layer 17 disposed on a core 16 covering at least a portion of the core. Preferably, the surface layer 17 covers the core 16 surface area completely. The core 16 is typically a fiber with a circular, oblong, elliptical, elongated or other cross-section. In one embodiment, the cross-section of the core has a major to minor axis aspect ratio of between 1 and 30. The core 16 and surface layer 17 may be co-extruded together, or the surface layer 17 may be applied to the core 16 after the core 16 has been formed. The fiber element 15 is oriented before or after the surface layer 17 is formed in order to increase the orientation of the core 16 so as to provide increased strength and stiffness.

Figure 3D:
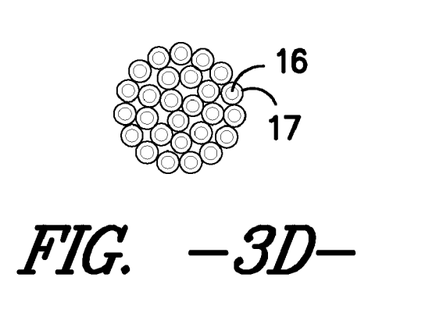
FIGS. 3D-E illustrate schematically additional cross-sections of fiber elements.
Figure 3E:
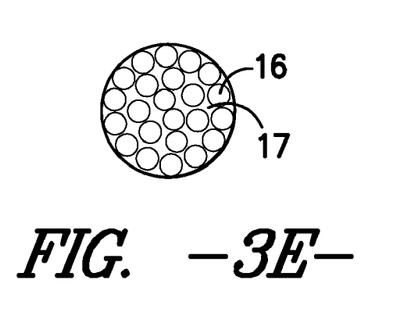

Referring to FIG. 3D, there is shown an additional embodiment of a number of fiber elements being of a core/shell type fiber elements together (each made up of a surface layer 17 disposed on a core 16 covering at least a portion of the core). While it is shown that the shape grouping or cluster of fibers elements is a circular, the group shape may also be elongated or other shapes. Additionally, each fiber element 15 may have the same or different cross-sectional shapes. Once in the composite, the shape of the grouping may also change. FIG. 3E shows a number of fiber elements with cores 16 surrounded by a surface layer 17. In this embodiment, the surface layer 17 surrounds all of the cores 16. In one embodiment, the core 16 has a major axis diameter of between 1 and 1000 micrometers (preferably between 50 and 500 micrometers) and the surface layer has a thickness of between about 5 and 30% of the total.

The core 12, 16 of the tape and fiber elements 10,15 are preferably made up of a molecularly-oriented thermoplastic polymer, the core 12, 16 being fusible to each of surface layers 14, 14',17 at their respective intersections. The core 12, 16 is compatibly bonded to each of surface layers 14, 14', 17 between their contiguous surfaces. It is further contemplated that the surface layers 14, 14', 17 have a softening temperature, or melting temperature, lower than that of the core 12, 16. By way of example only, it is contemplated that the core 12, 16 is a polyolefin polymer such as polypropylene, polyethylene, polyester such as polyethylene terephthalate, or polyamide such as Nylon 6 or Nylon 6,6 (polyester and polyurethane are common core materials with low-melt polyester, polypropylene or polyethylene shells). Core-wrap yarns are also common materials and include elastomeric yarns wrapped with fibers of other materials to impart different aesthetics, hand, color, UV resistance, etc. The preferred core/shell materials for this invention are polyolefin in nature where a highly drawn and therefore highly oriented polypropylene or polyethylene has a lower softening point polyolefin surface layer commonly comprised of homopolymers or copolymers of ethylene, propylene, butene, 4-methyl-1-pentene, and/or like monomers. According to one potentially preferred practice, the core 12, 16 may be polypropylene or polyethylene. The core 12, 16 may account for about 50-99 wt. % of the tape or fiber element, while the surface layers 14, 14', 17 account for about 1-50 wt. % of the tape or fiber element. The core 12, 16 and surface layers 14, 14', 17 being made up of the same class of materials to provide an advantage with regard to recycling, as the core 12, 16 may include production scrap.

In an embodiment where the core 12 or 16 is polypropylene, the material of surface layers 14, 14', 17 is preferably a copolymer of propylene and ethylene or an α-olefin. In one embodiment, the surface layers 14, 14', 17 comprise a random copolymer of propylene-ethylene with an ethylene content of about 1-25 mol. %, and a propylene content of about 75-99 mol. %. It may be further preferred to use said copolymer with a ratio of about 95 mol. % propylene to about 5 mol. % ethylene. Instead of said copolymer or in combination therewith, a polyolefin, preferably a polypropylene homopolymer or polypropylene copolymer, prepared with a metallocene catalyst, may be used for the surface layers 14, 14', 17. It is also contemplated that materials such as poly(4-methyl-1-pentene) (PMP) and polyethylene may be useful as a blend with such copolymers in the surface layers 14, 14', 17. The surface layer material should be selected such that the softening point of the surface layer 14, 14', 17 is at least about 10° C. lower than that of the core layer 12, and preferably between about 15-40° C. lower. The upper limit of this difference is not thought to be critical, and the difference in softening points is typically less than 70° C. Softening point, for this application, is defined as the Vicat softening temperature (ASTM D1525). It is desirable to minimize the amount of adhesive used to maximize the amount of fiber elements in a composite.

By way of example only, and not limitation, one tape element 10 that may be particularly useful is believed to be marketed under the trade designation PURE by Lankhorst/Indutech having a place of business in Sneek, The Netherlands.

Figure 4A:
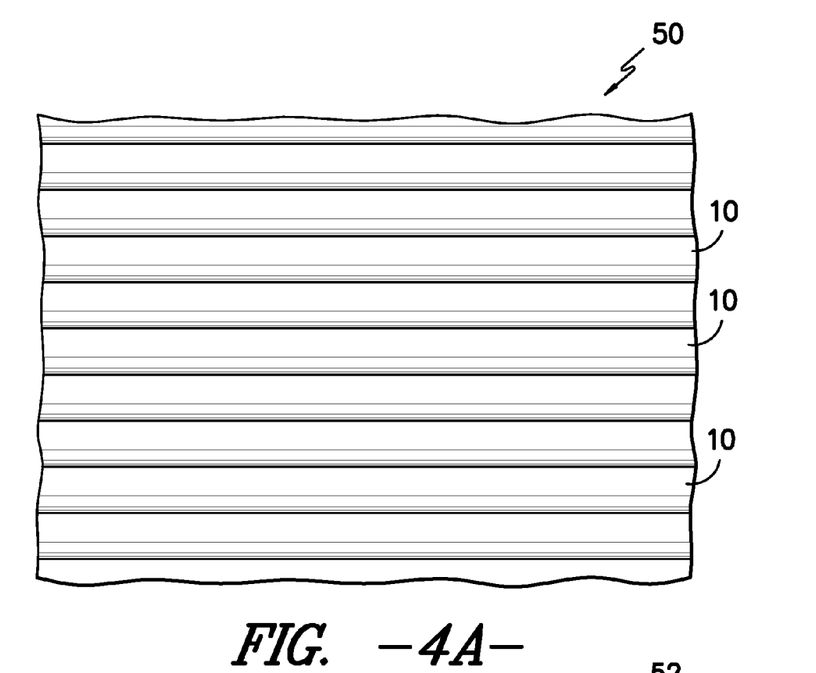
FIG. 4A illustrates schematically a unidirectional sheet made up of monoaxially drawn tape elements.

FIG. 4A illustrates a unidirectional sheet 50 formed from a multiplicity of fiber elements being tape elements 10. The tape elements are aligned parallel along a common fiber direction of the unidirectional sheet 50. In one embodiment, the tape elements 10 in the unidirectional sheet 50 do not overlap one another, and may have gaps between the tape elements 10. In another embodiment, the tape elements overlap one another up to 90% in the unidirectional sheet 50. The unidirectional sheet 50 is preferably able to be bent to a radius of about 1 cm without affecting its physical performance. One approach for aligning the tape elements is to align the tape elements into a sheet by pulling yarn from a creel. Using a roll-off creel is helpful to reduce twist in the yarn.

Figure 4B:
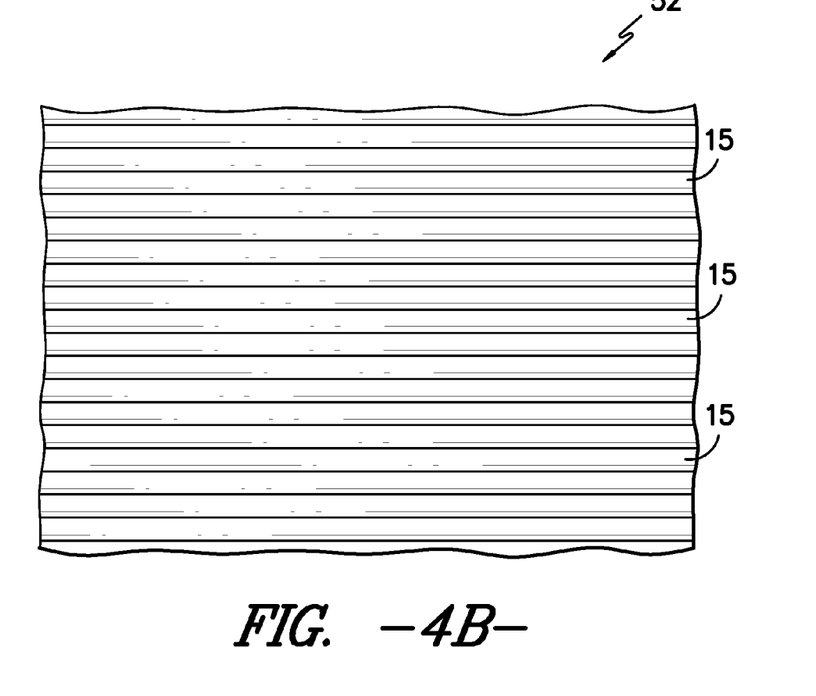
FIG. 4B illustrates schematically a unidirectional sheet made up of core/shell fiber elements.

FIG. 4B illustrates a unidirectional sheet 52 formed from a multiplicity of core/shell type fiber elements 15. The fiber elements 15 are aligned parallel along a common fiber direction of the unidirectional sheet 52. In one embodiment the fiber elements 15 in the unidirectional sheet 52 do not overlap one another, and may have gaps between the fiber elements 15. In another embodiment, the fiber elements may overlap one another up to 90% in the unidirectional sheet 52. The unidirectional sheet 52 may additionally have a polymer matrix. The unidirectional sheet 52 is preferably able to be bent to a radius of about 1 cm without affecting its physical performance. One approach for aligning the fiber elements is to align the tape elements into a sheet by pulling yarn from a creel. Using a roll-off creel is helpful to reduce twist in the yarn.

Figure 5A:
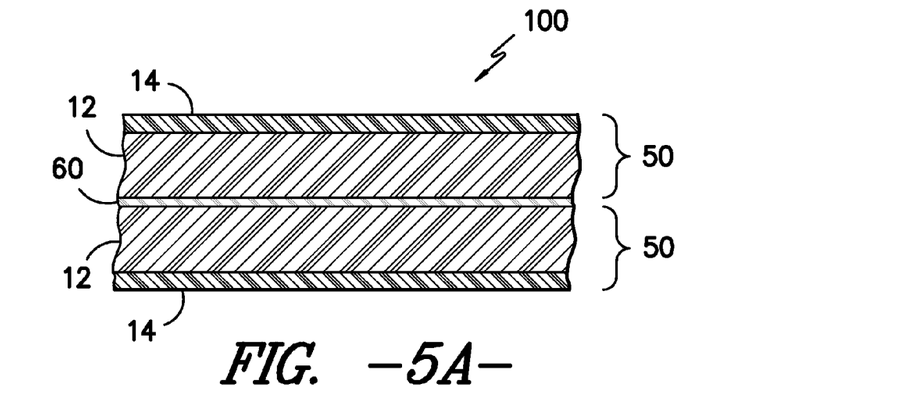
FIG. 5A illustrates schematically a cross-section of one embodiment of the composite sheet.
Figure 5B:
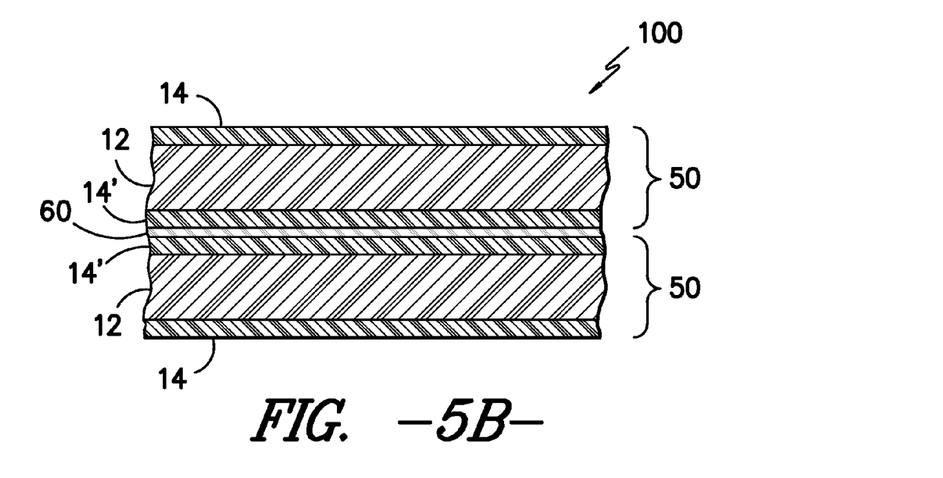
FIG. 5B illustrates schematically a cross-section of one embodiment of the composite sheet.

FIGS. 5 and 5B illustrate composite sheets, each made up of two unidirectional sheets 50 and one adhesive layer 60. The composite sheets are easier to handle than the unidirectional sheets, as the unidirectional sheets are composed of the tape elements 10 not bound in any way to one another. In the embodiment where the unidirectional sheets are made up of tape elements 10 with a core layer 12 and one surface layer 14 (as shown in FIG. 5A) the adhesive layer 60 is adjacent and sandwiched between the core layers 12 of the tape elements 10 in the unidirectional sheet 50. In the embodiment where the unidirectional sheets are made up of tape elements 10 with a core layer 12 and two surface layers 14 and 14' (shown in FIG. 5B), the adhesive layer 60 is adjacent to and sandwiched between the surface layers 14' of the tape elements 10. Within each composite sheet 100, the common fiber direction of the unidirectional sheets 50 may be aligned, or rotated relative to each other, for example 90 degrees. Preferably, the common fiber direction of the unidirectional sheets 50 in the composite sheet 100 are the same.

Figure 6:
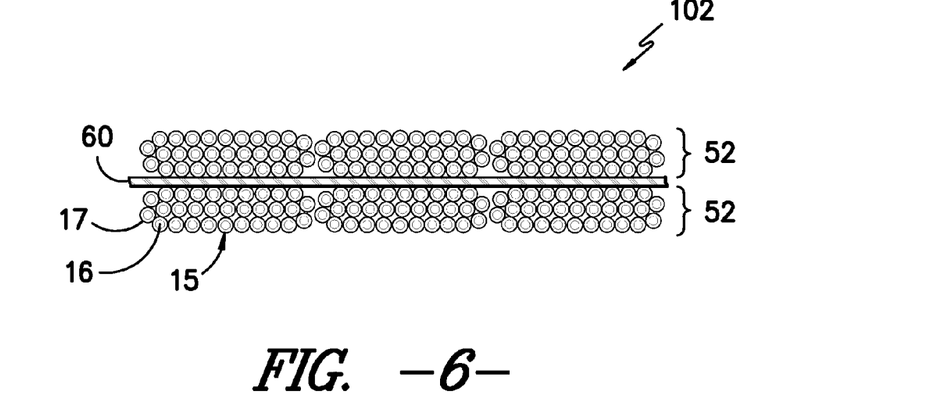
FIG. 6 illustrates schematically a cross-section of one embodiment of the composite sheet.

FIG. 6 illustrates composite sheets, each made up of two unidirectional sheets 52 formed from fiber elements 15 and one adhesive layer 60. The composite sheets are easier to handle than the unidirectional sheets, as the unidirectional sheets are composed of the fiber elements 15 not bound in any way to one another. The adhesive layer 60 is adjacent and sandwiched between the surface layers 17 of the fiber elements 15. Within each composite sheet 102, the common fiber direction of the unidirectional sheets 52 may be aligned, or rotated relative to each other, for example 90 degrees. Preferably, the common fiber direction of the unidirectional sheets 52 in the composite sheet 102 are the same.

The adhesive layer 60 preferably comprises a material which is compatible with the unidirectional material and fuses the unidirectional material into a unidirectional sheet 52. The adhesive layer may be activated to fuse the unidirectional material by pressure, heat, UV, other activation methods, or any combination thereof. In one embodiment, the adhesive is a pressure sensitive adhesive. In another embodiment, the adhesive has a softening point less than that of the surface layer of the fiber elements. Preferably, the softening point of the adhesive is at least 10° C. less than that of the surface layer of the fiber elements. In one embodiment, a melting point of less than 130° C. is preferred. For unidirectional sheets made up of tape or fiber elements with an olefin core and surface layers, the adhesive layer 60 may be, but is not limited to EVA, LLDPE, LDPE, HDPE, copolymers of polypropylene, and the like. The adhesive layer 60 preferably has a lower softening temperature than the layer of the tape or fiber element 10, 15 adjacent to the adhesive layer 60. This corresponds to the core layer 12 for the tape element 10 having a core layer 12 and one surface layer 14 (as shown in FIG. 5A), the surface layer 14' for the tape element 10 having a core layer 12 and surface layers 14 and 14' (as shown in FIG. 5B), and the surface layer 17 for a fiber element 15 (as shown in FIG. 6). The adhesive layer 60 preferably has a thickness of between about 10 μm and 100 μm. For pressure sensitive adhesives, the amount of tack is preferably high enough to stabilize the unidirectional sheets for handling.

The adhesive layer may be applied to the unidirectional sheets 50, 52 by any method known in the art. Preferred methods include any well known coating method such as air knife coating, gravure coating, hopper coating, roller coating, spray coating, and the like. The coating composition can be based on water or organic solvent(s) or a mixture of water and organic solvent(s). Alternatively, the adhesive layer 60 can be formed by thermal processing such as extrusion and co-extrusion with and without stretching, blow molding, injection molding, lamination, etc. The adhesive layer 60 may also be an adhesive scrim, powder coating, or the like.

Referring now to FIGS. 7A-B and 8A-B, there is shown different embodiments of the impact resistant component 200. While the impact resistant components 200 shown in FIG. 7A-B and 8A-B are formed from 2 composite sheets 100, additional composites sheets 100 may be added to the top or bottom of the impact resistant component 200 shown. Preferably, the adhesive layers 60 are in an amount of about 0.2 to 20%, more preferably about 2-10% of the weight of the impact resistant component. In one embodiment, the tape elements and the adhesive layer comprise polypropylene. This creates an impact resistant component that is essentially polypropylene increasing the recycleability of the component.

Figure 9A:
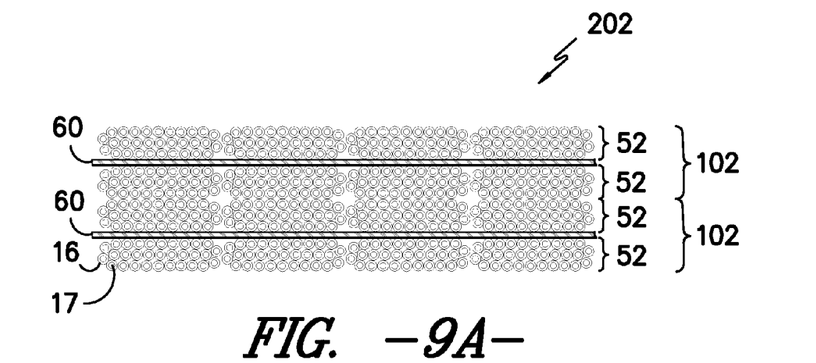
FIGS. 9A and B illustrate schematically a cross-section of one embodiment of the impact resistant component.
Figure 9B:
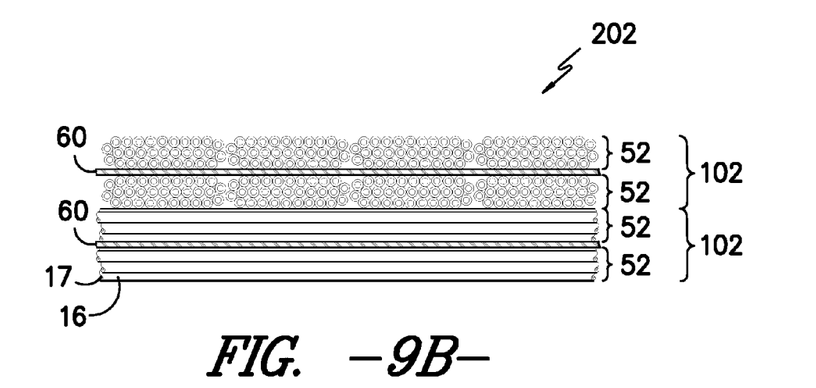

Referring now to FIGS. 9A-B, there is shown another embodiment of the impact resistant component 202 formed from shell/core type fiber elements 15. While the impact resistant components 202 shown in FIG. 9A-B are formed from 2 composite sheets 102, additional composites sheets 102 may be added to the top or bottom of the impact resistant component 202 shown. Preferably, the adhesive layers 60 are in an amount of about 0.2 to 20%, more preferably about 2-10% of the weight of the impact resistant component. In one embodiment, the fiber elements and the adhesive layer comprise polypropylene. This creates an impact resistant component that is completely or essentially polypropylene increasing the recycleability of the component.

Figure 7A:
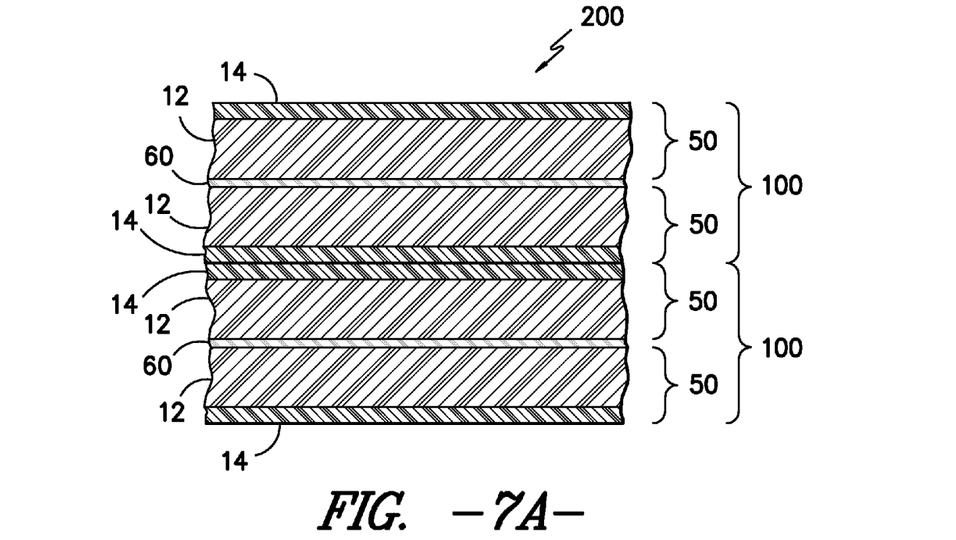
FIGS. 7A and B illustrate schematically a cross-section of one embodiment of the impact resistant component.
Figure 7B:
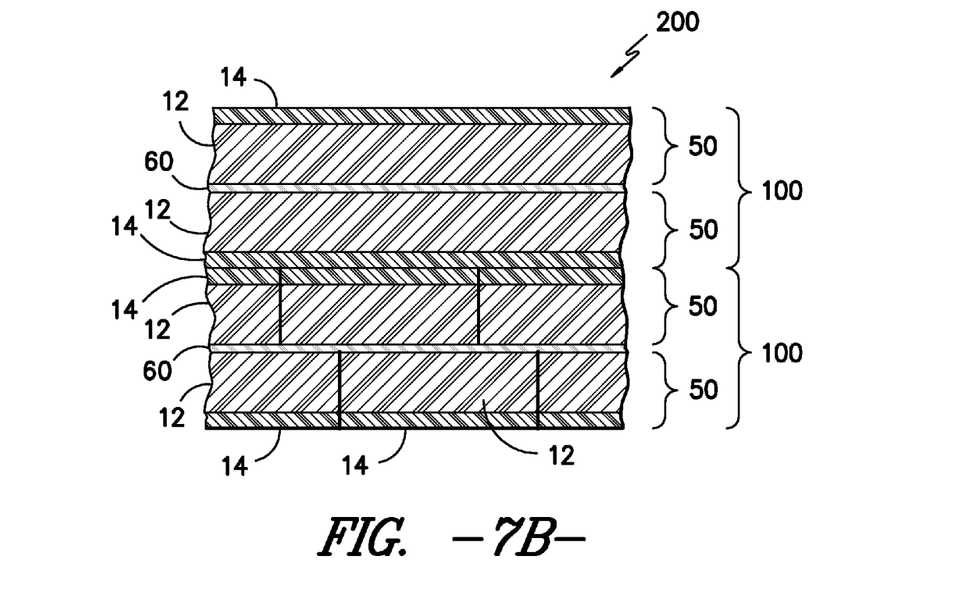

Referring back to FIGS. 7A and B, there is shown impact resistant components formed from tape elements 10 with a core layer 12 and one surface layer 14. The impact resistant component 200 is formed when the surface layers 14 from the composite sheets 100 are fused using heat and optionally pressure. There are no additional layers, adhesives, or treatments added to the surface layers 14 of the tape elements 10. In FIG. 7A, the common fiber direction of the unidirectional sheets 50 in one composite sheet 100 is the same (parallel to) as the common fiber direction of the unidirectional sheets 50 of the adjacent composite sheet 100. In FIG. 7B, the common fiber direction of the unidirectional sheets 50 in one composite sheet 100 is the perpendicular (rotated 90 degrees) to the common fiber direction of the unidirectional sheets 50 of the adjacent composite sheet 100. While in FIGS. 7A and B, 0 and 90 degree rotations have been shown; any rotation angle is feasible and contemplated. The structure of the impact resistant component of FIGS. 7A and B in written form is as follows:

. . . AB-Adh-BA-AB-Adh-BA . . .

(B being the core layer, A being a surface layer, and Adh being the adhesive layer)

Figure 8A:
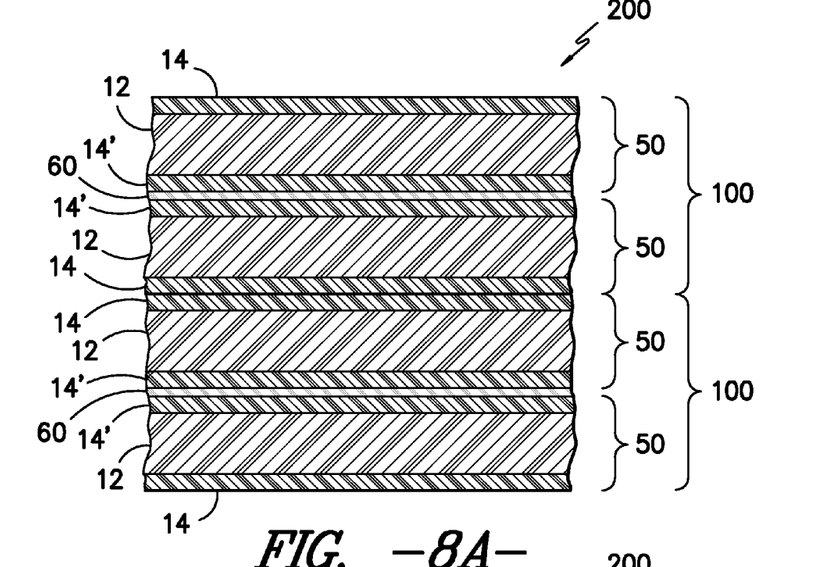
FIGS. 8A and B illustrate schematically a cross-section of one embodiment of the impact resistant component.
Figure 8B:
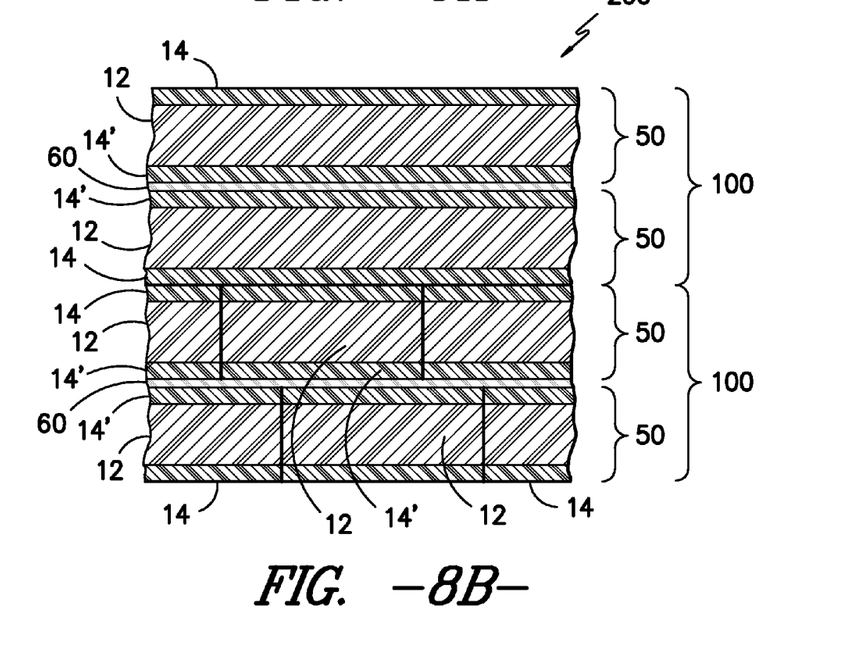

The impact resistant components shown in FIGS. 8A and B are formed from tape elements 10 with a core layer 12 and two surface layers 14 and 14'. The impact resistant component 200 is formed when the surface layers 14 from the composite sheets 100 are fused using heat and optionally pressure. There are no additional layers, adhesives, or treatments added to the surface layers 14 of the tape elements 10. In FIG. 8A, the common fiber direction of the unidirectional sheets 50 in one composite sheet 100 is the same (parallel to) as the common fiber direction of the unidirectional sheets 50 of the adjacent composite sheet 100. In FIG. 8B, the common fiber direction of the unidirectional sheets 50 in one composite sheet 100 is the perpendicular (rotated 90 degrees) to the common fiber direction of the unidirectional sheets 50 of the adjacent composite sheet 100. While in FIGS. 8A and B, 0 and 90 degree rotations have been shown, any rotation angle is contemplated. The structure of the impact resistant component of FIGS. 8A and B in written form is as follows:

... ABA'-Adh-A'BA-ABA'-Adh-A'BA ...

(B being the core layer, A and A' being surface layers, and Adh being the adhesive layer).

The impact resistant components 202 shown in FIGS. 9A and B are formed from fiber elements 15 with a core 16 and a surface layer 17. The impact resistant component 202 is formed when the surface layers 17 from the composite sheets 102 are fused using heat and optionally pressure. There are no additional layers, adhesives, or treatments added to the surface layers 17 of the fiber elements 15. In FIG. 9A, the common fiber direction of the unidirectional sheets 52 in one composite sheet 102 is the same (parallel to) as the common fiber direction of the unidirectional sheets 52 of the adjacent composite sheet 102. In FIG. 9B, the common fiber direction of the unidirectional sheets 52 in one composite sheet 102 is the perpendicular (rotated 90 degrees) to the common fiber direction of the unidirectional sheets 52 of the adjacent composite sheet 102. While in FIGS. 9A and B, 0 and 90 degree rotations have been shown, any rotation angle is contemplated.

Figure 10A:
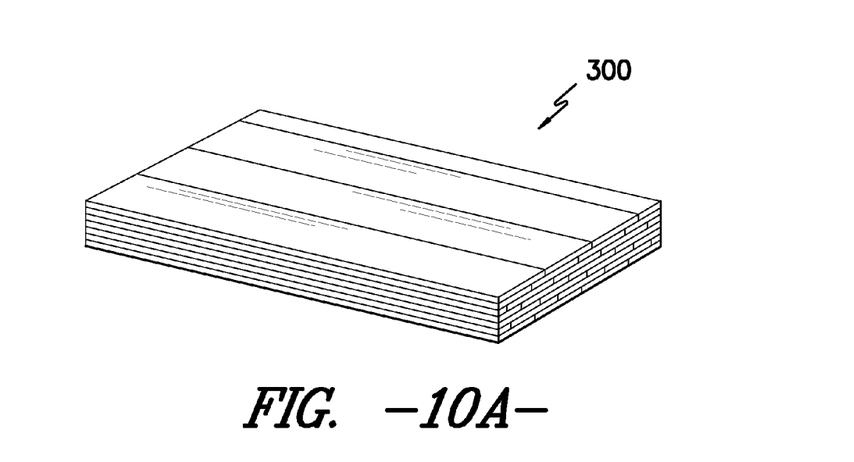
FIGS. 10A-B illustrate schematically an anti-ballistics panel.

FIG. 10A illustrates an anti-ballistics panel 300, according to one embodiment of the invention. The anti-ballistics panel 300 is made up of at least 10 composite sheets 100 formed from tape elements 10 fused together, more preferably 20 to 100. The core/shell nature of the fiber elements 15 has not been shown to reduce the complexity of the illustration. It has been shown that 10 composite sheets 100 fused together resist penetration by objects. While the anti-ballistics panel 300 is shown with the common fiber direction of each unidirectional sheet 50 parallel to the adjacent sheets, each unidirectional sheet 50 may be rotated any amount with respect to the adjacent unidirectional sheets 50.

Figure 10B:
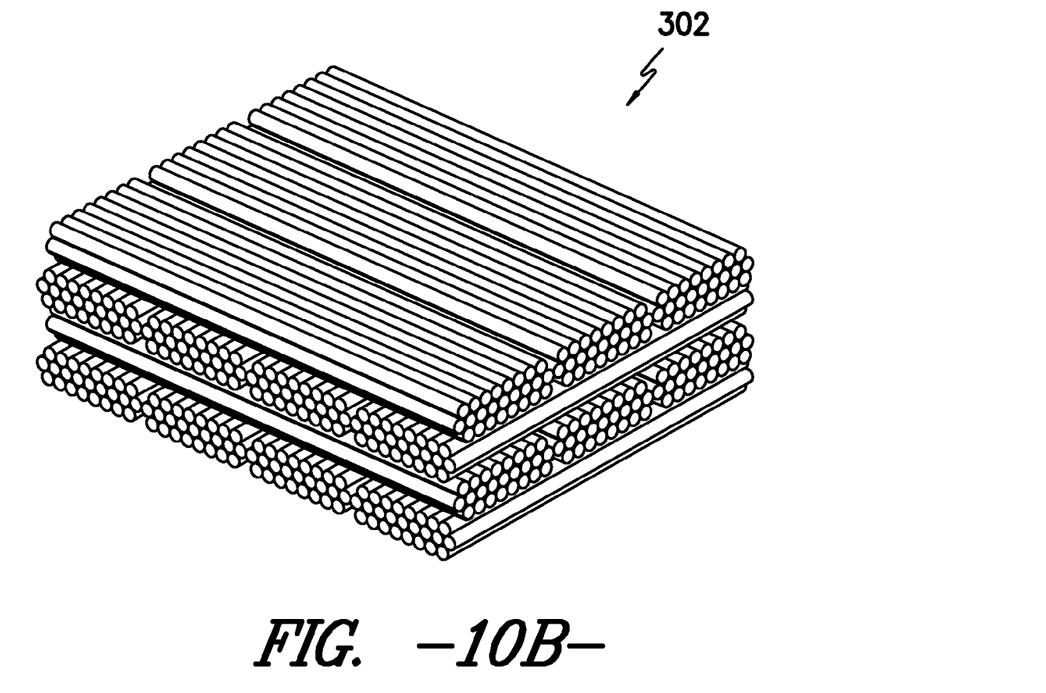

FIG. 10B illustrates an anti-ballistics panel 302, according to one embodiment of the invention. The anti-ballistics panel 302 is made up of at least 10 composite sheets formed from fiber elements 15 fused together, more preferably 20 to 100. It has been shown that 10 composite sheets 102 fused together resist penetration by objects. While the anti-ballistics panel 302 is shown with the common fiber direction of each unidirectional sheet 52 rotated 90 degrees with respect to the adjacent layers, each unidirectional sheet 52 may be rotated any amount with respect to the adjacent unidirectional sheets 52.

Figure 11:
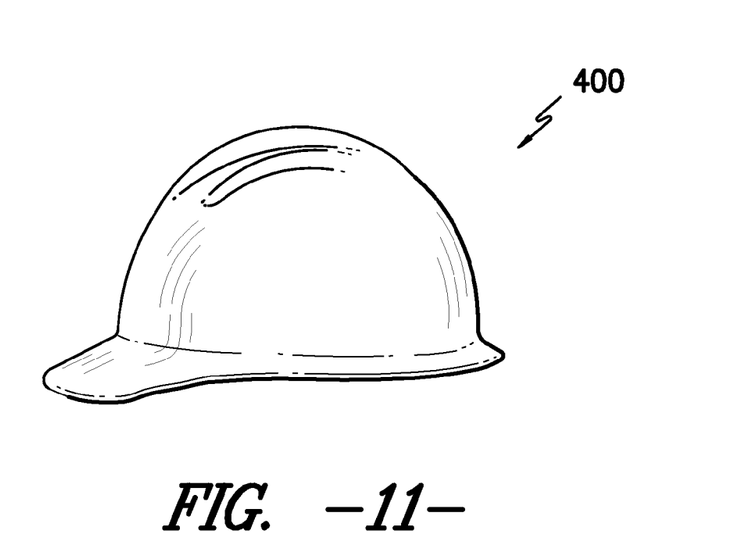
FIG. 11 illustrates schematically a molded article.

The impact resistant component 200, 202 and the anti-ballistics panel 300, 302 are adapted for three dimensional thermo-molding. One example is shown in FIG. 11 of a molded helmet 400. Other articles of the impact resistant component 200, 202 and the anti-ballistics panel 300, 302 may be molded into include chest plates, extremity protection, vehicle panels, or other applications where anti-ballistic properties are required with a light weight panel.

The process for forming an impact resistant component comprises:

1) forming unidirectional sheets comprising arranging a plurality of monoaxially drawn fibers substantially parallel to one another along a common fiber direction, the fiber elements (10 or 15) comprising a core (12 or 16) of a strain oriented polymer and at least one surface layer (14 or 17) of a heat fusible polymer surface at least a portion of the core (12 or 16), wherein the at least one surface layer (14 or 17) is characterized by a softening temperature below that of the core (12 or 16) to permit fusion bonding upon application of heat.

2) sandwiching an adhesive layer 60 between two unidirectional sheets (50 or 52).

3) activating (preferably by heat) the sandwiched adhesive layer 60 and unidirectional sheets (50 or 52) to a approximately the melting temperature of the adhesive layer 60 to form a composite sheet (100 or 102) with optional pressure.

4) stacking at least 2 composite sheets (100 or 102).

5) applying heat (and optionally pressure of between about 0.5 and 150 bars) to the stacked composite sheets (100 or 102) to bond the surface layers (14 or 17) of the composite sheets (100 or 102) together.

Forming an anti-ballistics panel (300 and 302) follows the same steps as above, except that at least 10 composite sheets (100, 102) are stacked together. The method discloses the tape elements 10 comprising a core layer 12 and surface layers 14 and 14', the method also applies for impact resistant components 200 and anti-ballistics panels 300 made from tape elements 10 having a core layer 12 and one surface layer 14. The surface layers 14 between the composite sheets fuse to form the component 200 or panel 300.

According to one contemplated practice, the layers of composite sheets 100 or 102 may be formed from a single composite sheet 100 or 102 that is repeatedly folded over itself, or from several discrete overlaid composite sheets 100 or 102. Alternatively, the impact resistant component 200 or 202 may be formed by reheating several previously fused composite sheets 100 or 102. The anti-ballistics panel 300 or 302 may be formed by reheating several previously fused composite sheets 100 or 102 or impact resistant components 200 or 202. When such previously fused material is subjected to a temperature above the softening point of the surface layers 14, 14' or 17 and below that of the core 12, 17, the matrix will again melt while the core layers remain substantially solid. Upon cooling, the surface layers 14, 14', 17 will again fuse and re-form the matrix. Any of these methods may be employed to form a component 200 or 202 or panel 300 or 303 with any desired thickness or number of sheets. Additionally, it is contemplated that a component or panel may be made with a mixture of unidirectional sheets 50 with tape and elements and unidirectional sheets 52 with core/shell fiber elements.

Consolidation of composite sheets 100, 102 are preferably carried out at suitable temperature and pressure conditions to facilitate both interface bonding fusion and partial migration of the melted surface layer material between the layers. Heated batch or platen presses may be used for multi-layer consolidation. However, it is contemplated that any other suitable press may likewise be used to provide appropriate combinations of temperature and pressure. According to a potentially preferred practice, heating is carried out at a temperature of about 130-160° C. and a pressure of about 0.5-70 bar. When exposed to such an elevated temperature and pressure, the surface layers 14, 14', 17 will soften or even melt while the core layer 12, 16 will remain substantially solid. Upon cooling, the surface layers 14, 14', 17 will fuse thereby forming a matrix through which the stiff core layers 12, 16 are distributed. According to a potentially preferred practice, cooling is carried out under pressure to a temperature less than about 115° C. It is contemplated that maintaining pressure during the cooling step tends to inhibit shrinkage. Without wishing to be limited to a specific theory, it is believed that higher pressures may facilitate polymer flow at lower temperatures. Thus, at the higher end of the pressure range, (greater than about 20 bar) the processing temperature may be about 90-135° C. Moreover, the need for cooling under pressure may be reduced or eliminated when these lower temperatures are utilized. The temperature operating window to fuse the sheets is wide allowing for various levels of consolidation to occur thus achieving either a more structural panel or one that would delaminate more with impact. This delamination helps in the energy absorption of an impact such as a bullet.

EXAMPLES

The tape elements used in each of the examples were fusible mono-axially drawn tape elements having dimensions of 2.2 mm wide×65 microns thick sold under the trade designation PURE by Lankhorst/Indutech having a place of business in Sneek, The Netherlands. The tape elements had a polypropylene core layer surrounded by two polypropylene copolymer surface layers. The surface layers comprised about 15% by thickness of the total tape element.

The adhesive layer was a 0.00035 in (approximately 8 μm) polyethylene film having a melting point of about 115° C.

The composite sheets were formed by loading a roll of creel with 224 packages of yarn and creating two unidirectional sheets with 11.2 yarns per inch. The low melt polyethylene film was sandwiched between the sheets, heating the composite up to the melt pointing of the film, pressing the composite together, and cooling to lock the yarns together into a unidirectional sheet. The composite was heated to a temperature of about 220° F. and run through a nip with about 90 pli (pounds per linear inch). The common fiber directions of the two unidirectional sheets were aligned. The yarn spacing was 11.2 ends/inch. Each composite sheet was then cut into 10×12 inch pieces and stacked so that the common fiber direction in the unidirectional sheets alternated from 0 degrees to 90 degrees from composite sheet to adjacent composite sheet. This alternating cross plying process continued until the weight equaled 1.5 pounds per square foot (psf) and 2.3 psf to form the impact resistant unidirectional component examples. The weight of the adhesive layer was 8% of the total weight of the example. This stack of cross plied unidirectional sheet was then placed in to a cold platen press. Pressure was applied to achieve 300 psi and the platens were then heated to 300° F. After the temperature reached 290° F. in the center of the stack (measured by a thermocouple), cooling was initiated. This process was completed on several panels so that ballistic testing could be completed.

The standard twill fabric samples (comparison examples) were formed from the tape elements as described woven into a twill weave mat fabric with 11 picks and ends per inch. The layers were stacked until the weight equaled 1.5 pounds per square foot (psf) and 2.3 psf for the testing examples. The stacked layers were placed in a platen press at 300° F. where 300 psi pressure was applied until the core reached 290° F. The examples were then cooled to 150° F., had the pressure released and were removed from the press.

Examples were then subjected to ballistic testing under the Department of Defense MIL-STD-662 V50 Ballistic Test for Armor. The resulting $V_{50}$ measurements for each threat and conditions are below. The $V_{50}$ is the calculated speed in feet per second that the projectile travels during testing. This speed represents the speed in which the bullet would pass through the panel 50% of the time and be stopped by the panel 50% of the time.

| Fabric const. | Panel Arial Density | Normalized Areal Density | Bullet | $V_{50}$ | % reduction in $V_{50}$ |
|---|---|---|---|---|---|
| Unidirectional | 1.5 psf | 1.38 psf | 17 grain FSP | 1483 | 2.6% |
| Twill Fabric | 1.5 psf | 1.5 psf | 17 grain FSP | 1522 | |
| Unidirectional | 2.3 psf | 2.12 psf | 44 magnum | 1377 | 2.6% |
| Twill Fabric | 2.3 psf | 2.3 psf | 44 magnum | 1414 | |

The unidirectional panels had approximately 8% by weight of the adhesive layer. The normalized areal density is the density of the tape elements in the panel (therefore, for the unidirectional panels, the normalized areal density is 8% less than the actual density). For equivalent normalized areal densities, the V50 of these unidirectional panels is expected to be 5% better than the panel made from twill fabric. The reduction in $V_{50}$ as the unidirectional panel is compared to the panel made from twill fabric in both cases was approximately 2.6%. The unidirectional panel had 8% less by weight of the tape elements (the reinforcing elements), but the resultant panel had a reduction in $V_{50}$ performance of only 2.6%.

The invention has been described in detail with particular reference to certain preferred embodiments thereof, but it will be understood that variations and modifications can be effected within the spirit and scope of the invention.

What is claimed is:

1. A process of forming an impact resistant component comprising, in order:
   arranging a plurality of monoaxially drawn fiber elements substantially parallel to one another along a common fiber direction to form a unidirectional sheet, wherein the fiber elements comprise a core of a strain oriented polymer and one surface layer of a heat fusible polymer covering at least a portion of one side of the core, wherein the surface layer is characterized by a softening temperature below that of the core to permit fusion bonding upon application of heat, wherein the fiber elements are arranged such that the surface layers of the monoaxially drawn fiber elements are on one side of the unidirectional sheet forming the surface layer side of the unidirectional sheet and the cores of the fiber elements are on the opposite side of the unidirectional sheet forming the core side of the unidirectional sheet;
   stacking in order:
      a first unidirectional sheet;
      an adhesive layer; and,
      a second unidirectional sheet, wherein the core side of the first unidirectional sheet and the core side of the second unidirectional sheet face the adhesive layer, wherein the adhesive layer has a softening point lower than the surface layer of the fiber elements,
   and wherein the monoaxially drawn fibers in the first and second unidirectional sheets have the same common fiber direction;
   activating the adhesive layer adhering the first and second unidirectional sheets and the adhesive layer together to form a composite sheet, wherein activating the adhesive layer comprises heating the adhesive layer to a temperature at or above the softening temperature of the adhesive layer, wherein the surface layer side of the first unidirectional sheet and surface layer side of the second unidirectional sheet form the exterior surface of the composite sheet;
   stacking at least two (2) composite sheets;
   applying heat to the stacked composite sheets to bond the surface layers of the fiber elements on the exterior surface of one composite sheet to the surface layers of the fiber elements on the exterior surface of an adjacent composite sheet together.

2. The process of claim 1, wherein the surface layer and the core of the fiber elements comprise an olefin polymer.

3. The impact resistant component of claim 1, wherein the common fiber direction of the fiber elements of the unidirectional sheets of one composite sheet are perpendicular to the common fiber direction of the fiber elements of the unidirectional sheets of the adjacent composite sheets.

4. The impact resistant component of claim 1, wherein the common fiber direction of the fiber elements of the unidirectional sheets of one composite sheet are parallel to the common fiber direction of the fiber elements of the unidirectional sheets of the adjacent composite sheets.

5. The process of claim 1, wherein the at least two composite sheets are fused together without added adhesives.

6. The process of claim 1, wherein the adhesive layer is in an amount of between about 0.2 to 10% of the weight of the impact resistant component.

7. The process of claim 1, wherein at least ten (10) composite sheets are stacked together applying heat to the stacked sheets to bond the surface layers of the fibers in the composite sheets together.

8. A process of forming an impact resistant component comprising, in order:
   arranging a plurality of monoaxially drawn fiber elements substantially parallel to one another along a common fiber direction to form a unidirectional sheet, wherein the fiber elements comprise a core of a strain oriented polymer and a surface layer of a heat fusible polymer that covers at least two sides of the core of the fiber element, wherein the surface layer is characterized by a softening temperature below that of the core to permit fusion bonding upon application of heat;
   stacking in order:
      a first unidirectional sheet;
      an adhesive layer; and,
      a second unidirectional sheet,
   wherein the unidirectional sheets have the same common fiber direction, and wherein the adhesive layer has a softening point lower than the surface layer of the fiber elements;
   activating the adhesive layer adhering the first and second unidirectional sheets to the adhesive layer to form a composite sheet, wherein activating the adhesive layer comprises heating the adhesive layer to a temperature at or above the softening temperature of the adhesive layer, wherein the surface layers of the fiber elements in the first and second unidirectional sheets form the exterior surface of the composite sheet;
   stacking at least two (2) composite sheets;
   applying heat to the stacked composite sheets to bond the surface layers of the fiber elements on the exterior surface of one composite sheet to the surface layers of the fiber elements on the exterior surface of an adjacent composite sheet together.

9. The impact resistant component of claim 8, wherein the surface layer and the core of the fiber elements comprises an olefin polymer.

10. The impact resistant component of claim 8, wherein the common fiber direction of the fiber elements of the unidirectional sheets of one composite sheet are perpendicular to the common fiber direction of the fiber elements of the unidirectional sheets of the adjacent composite sheets.

11. The impact resistant component of claim 8, wherein the common fiber direction of the fiber elements of the unidirectional sheets of one composite sheet are parallel to the common fiber direction of the fiber elements of the unidirectional sheets of the adjacent composite sheets.

12. The process of claim 8, wherein the at least two composite sheets are fused together without added adhesives.

13. The process of claim 8, wherein the adhesive layer is in an amount of between about 0.2 to 10% of the weight of the impact resistant component.

14. The process of claim 8, wherein at least ten (10) composite sheets are stacked together applying heat to the stacked sheets to bond the second surface layers of the fibers in the composite sheets together.

* * * * *